(12) United States Patent
Zhang

(10) Patent No.: US 10,998,734 B2
(45) Date of Patent: May 4, 2021

(54) POWER ADAPTER AND TERMINAL

(71) Applicant: GUANG DONG OPPO MOBILE TELECOMMUNICATIONS CORP., LTD., Guangdong (CN)

(72) Inventor: Jialiang Zhang, Guangdong (CN)

(73) Assignee: GUANG DONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 15/115,245

(22) PCT Filed: Jan. 9, 2015

(86) PCT No.: PCT/CN2015/070458
§ 371 (c)(1),
(2) Date: Jul. 28, 2016

(87) PCT Pub. No.: WO2015/113461
PCT Pub. Date: Aug. 6, 2015

(65) Prior Publication Data
US 2017/0012451 A1  Jan. 12, 2017

(30) Foreign Application Priority Data

Jan. 28, 2014  (CN) .......................... 201410042510.5
Jan. 28, 2014  (CN) .......................... 201410042698.3
(Continued)

(51) Int. Cl.
*H02J 7/00* (2006.01)
*H02J 5/00* (2016.01)
(Continued)

(52) U.S. Cl.
CPC ........ *H02J 7/00* (2013.01); *H02J 5/00* (2013.01); *H02J 7/02* (2013.01); *H02J 7/04* (2013.01);
(Continued)

(58) Field of Classification Search
CPC ........ H02J 7/02; H02J 5/00; H02J 7/04; H02J 7/0052; H02J 2007/0059;
(Continued)

(56) References Cited

U.S. PATENT DOCUMENTS 5,744,937 A   4/1998   Cheon
5,898,234 A   4/1999   Kitagawa
(Continued)

FOREIGN PATENT DOCUMENTS

CN   1388620 A   1/2003
CN   1476142 A   2/2004
(Continued)

OTHER PUBLICATIONS

China Patent Application No. 201580005216.X; Office Action; dated Oct. 27, 2017; 18 pages.
(Continued)

*Primary Examiner* — Drew A Dunn
*Assistant Examiner* — Sailesh Thapa
(74) *Attorney, Agent, or Firm* — BakerHostetler

(57) ABSTRACT

A power adapter and a terminal are provided. The power adapter includes a power conversion component and a charging interface, the charging interface including a power line; the power conversion component is configured to form a charging loop with a terminal via the power line, for charging a battery of the terminal. The power adapter further includes a communication component, the charging interface further comprises a data line; during a coupling of the power adapter to the terminal, the communication component is configured to perform a bidirectional communication with the terminal via the data line.

15 Claims, 1 Drawing Sheet

(30) Foreign Application Priority Data

Jan. 28, 2014 (CN) .......................... 201410043062.0
Jan. 28, 2014 (CN) .......................... 201410043148.3

(51) Int. Cl.
    *H02J 7/02*      (2016.01)
    *H02J 7/04*      (2006.01)
    *H04B 3/54*      (2006.01)

(52) U.S. Cl.
    CPC ....... *H02J 7/00034* (2020.01); *H02J 2207/20* (2020.01); *H04B 3/54* (2013.01)

(58) Field of Classification Search
    CPC ............. H02J 2007/0096; H02J 7/0077; H02J 7/0085; H02J 7/0088; H02J 7/00034; H02J 2207/20; H02J 50/001; H02J 50/005; H02J 50/10; H02J 50/12; H02J 50/30; H02J 50/40; H02J 50/402; H02J 50/50; H02J 50/502; H02J 50/60; H02J 50/70; H02J 50/80; H02J 50/90; H02J 7/00; H02J 7/0042; H02J 7/0044; H02J 7/0045; H05B 3/54
    See application file for complete search history.

(56) References Cited

U.S. PATENT DOCUMENTS

| | | | |
|---|---|---|---|
| 7,012,405 B2 | 3/2006 | Nishida et al. | |
| 7,376,846 B2 | 5/2008 | Hawkins et al. | |
| 7,474,079 B2 | 1/2009 | Hashimoto | |
| 7,528,574 B1 | 5/2009 | Adkins et al. | |
| 7,592,780 B2 | 9/2009 | Funabashi et al. | |
| 8,085,001 B2 | 12/2011 | Wang et al. | |
| 8,154,247 B2 | 4/2012 | Inha et al. | |
| 8,624,719 B2 | 1/2014 | Klose et al. | |
| 8,729,867 B2 | 5/2014 | Esnard-Domerego et al. | |
| 9,379,558 B2 | 6/2016 | Seethaler et al. | |
| 9,843,137 B2 | 12/2017 | McCracken et al. | |
| 2002/0175654 A1 | 11/2002 | Takano et al. | |
| 2003/0057922 A1 | 3/2003 | Odaohhara et al. | |
| 2004/0090209 A1 | 5/2004 | Nishida et al. | |
| 2004/0164714 A1 | 8/2004 | Hayashi | |
| 2004/0189253 A1 | 9/2004 | Tanabe et al. | |
| 2004/0195996 A1 | 10/2004 | Nishida | |
| 2005/0174094 A1* | 8/2005 | Purdy | H02J 7/0052 320/134 |
| 2006/0076921 A1 | 4/2006 | Kubota et al. | |
| 2006/0132087 A1 | 6/2006 | Chen et al. | |
| 2006/0232133 A1 | 10/2006 | Jae-deok | |
| 2006/0284595 A1 | 12/2006 | Hsieh et al. | |
| 2007/0007822 A1* | 1/2007 | Cioaca | H02J 7/0006 307/29 |
| 2008/0048621 A1 | 2/2008 | Yun | |
| 2008/0084189 A1 | 4/2008 | Kim | |
| 2008/0123378 A1* | 5/2008 | Chiang | H02M 1/32 363/80 |
| 2008/0258688 A1 | 10/2008 | Hussain et al. | |
| 2008/0315846 A1 | 12/2008 | Sato et al. | |
| 2010/0013442 A1 | 1/2010 | Yamazaki et al. | |
| 2010/0188238 A1 | 7/2010 | Yasuda et al. | |
| 2011/0115442 A1 | 5/2011 | Garrastacho et al. | |
| 2011/0221604 A1 | 9/2011 | Johnson | |
| 2011/0248670 A1* | 10/2011 | Yamazaki | H01M 2/0212 320/107 |
| 2011/0266873 A1 | 11/2011 | Tsuji | |
| 2011/0266874 A1 | 11/2011 | Soemantri et al. | |
| 2012/0098495 A1 | 4/2012 | Yang et al. | |
| 2012/0217935 A1 | 8/2012 | Hawawini et al. | |
| 2012/0229074 A1 | 9/2012 | Seethaler et al. | |
| 2013/0175978 A1 | 7/2013 | Hsiao | |
| 2013/0200847 A1 | 8/2013 | Kurokawa et al. | |
| 2013/0234649 A1 | 9/2013 | Sevier et al. | |
| 2015/0137789 A1* | 5/2015 | Furtner | G05F 5/00 323/318 |
| 2015/0180244 A1 | 6/2015 | Jung | |
| 2016/0049804 A1 | 2/2016 | Lee et al. | |
| 2016/0336779 A1* | 11/2016 | Hu | H02J 7/0052 |

FOREIGN PATENT DOCUMENTS

| | | | |
|---|---|---|---|
| CN | 1525619 A | 9/2004 | |
| CN | 1538587 A | 10/2004 | |
| CN | 1592029 A | 3/2005 | |
| CN | 1801570 A | 7/2006 | |
| CN | 101099280 A | 1/2008 | |
| CN | 101123365 A | 2/2008 | |
| CN | 101299544 A | 11/2008 | |
| CN | 101459347 A | 6/2009 | |
| CN | 101499670 A | 8/2009 | |
| CN | 101826740 A | 9/2010 | |
| CN | 101867204 A | 10/2010 | |
| CN | 101908771 A | 12/2010 | |
| CN | 101938160 A | 1/2011 | |
| CN | 102122739 A | 7/2011 | |
| CN | 201975834 U | 9/2011 | |
| CN | 101123365 B | 9/2012 | |
| CN | 202435073 U | 9/2012 | |
| CN | 102769312 A | 11/2012 | |
| CN | 102868820 A | 1/2013 | |
| CN | 102931709 * | 2/2013 | |
| CN | 102931709 A | 2/2013 | |
| CN | 102957193 A | 3/2013 | |
| CN | 102957193 A * | 3/2013 | ............... H02J 7/00 |
| CN | 103035966 A | 4/2013 | |
| CN | 103178595 A | 6/2013 | |
| CN | 103236568 A | 8/2013 | |
| CN | 203135543 U | 8/2013 | |
| CN | 203205946 U | 9/2013 | |
| CN | 103532211 A | 1/2014 | |
| CN | 104796011 * | 1/2014 | |
| CN | 103762702 A | 4/2014 | |
| CN | 203747451 U | 7/2014 | |
| CN | 203747454 U | 7/2014 | |
| CN | 203747485 U | 7/2014 | |
| EP | 1796243 A2 | 6/2007 | |
| EP | 2149958 A2 | 2/2010 | |
| EP | 2388884 A2 | 11/2011 | |
| JP | H08-237947 A | 9/1996 | |
| JP | H09-168241 A | 6/1997 | |
| JP | H11-308779 A | 11/1999 | |
| JP | 2002-044878 A | 2/2002 | |
| JP | 2002-354701 A | 12/2002 | |
| JP | 2003-092841 A | 3/2003 | |
| JP | 2007-327772 A | 12/2007 | |
| JP | 2008-035674 A | 2/2008 | |
| JP | 2010-040499 A | 2/2010 | |
| JP | 2011-172311 A | 9/2011 | |
| JP | 2012-151946 A | 8/2012 | |
| WO | WO 1995/006994 A1 | 3/1995 | |
| WO | WO 1999/017418 A1 | 4/1999 | |
| WO | WO 2009/057187 A1 | 5/2009 | |
| WO | WO 2009/086567 A1 | 7/2009 | |
| WO | WO-2009086567 A1 * | 7/2009 | ............... H02J 7/02 |
| WO | WO 2015/113349 A1 | 8/2015 | |

OTHER PUBLICATIONS

European Patent Application No. 15743946.4; Extended Search Report; dated Aug. 28, 2017; 7 pages.
China Patent Application No. 201410042510.5; First Office Action; dated May 4, 2016; 10 pages.
Japan Patent Application No. 2018-000055; Reasons for Refusal; dated Jan. 30, 2018; 3 pages.
Japan Patent Application No. 2018-000055; Reasons for Refusal; dated May 8, 2018; 3 pages.
Japan Patent Application No. 2016-549035; Reasons for Refusal; dated Aug. 28, 2018; 3 pages.
Japan Patent Application No. 2016-549040; Reasons for Refusal; dated Aug. 29, 2018; 2 pages.

(56) References Cited

OTHER PUBLICATIONS

Japan Patent Application No. 2017-212198; Reasons for Refusal; dated Aug. 28, 2018; 2 pages.
Korean Patent Application No. 10-2018-7012455; Reason for Refusal; dated Jul. 27, 2018; 4 pages.
China Patent Application No. 201410042698.3; First Office Action; dated May 23, 2016; 9 pages.
China Patent Application No. 201410043062.0; First Office Action; dated May 5, 2015;11 pages.
China Patent Application No. 201410043148.3; First Office Action; dated Apr. 26, 2016; 14 pages.
China Patent Application No. 201611041095.7; First Office Action; dated Jul. 30, 2018; 19 pages.
China Patent Application No. 201410042510.5; Second Office Action; dated Sep. 26, 2016; 12 pages.
International Patent Application No. PCT/CN2014/076871; Int'l Written Opinion and Search Report; dated Nov. 2, 2014; 9 pages.
International Patent Application No. PCT/CN2014/077032; Int'l Written Opinion and Search Report; dated Nov. 18, 2014; 8 pages.
International Patent Application No. PCT/CN2014/077284; Int'l Written Opinion and Search Report; dated Oct. 31, 2014; 7 pages.
Australian Patent Application No. 2014381131; Office Action; dated Sep. 12, 2017; 8 pages.
Australian Patent Application No. 2014381139; Office Action; dated Jul. 26, 2017; 3 pages.
Canada Patent Application No. 2938139; Office Action; dated Feb. 15, 2018; 5 pages.
Canada Patent Application No. 2938139; Office Action; dated May 24, 2017; 8 pages.
European Patent Application No. 14880534.4; Extended Search Report; dated Nov. 22, 2017; 7 pages.
European Patent Application No. 14880688.8; Extended Search Report; dated Oct. 11, 2017; 8 pages.
European Patent Application No. 14880925.4; Extended Search Report; dated Nov. 23, 2017; 8 pages.
Singapore Patent Application No. 11201606226S; Written Opinion and Search report; dated May 15, 2017; 8 pages.
European Patent Application No. 14881067.4; Extended Search Report; dated Oct. 19, 2017; 13 pages.
Singapore Patent Application No. 11201606227T; Written Opinion and Search Report; dated Jun. 20, 2017; 8 pages.
U.S. Appl. No. 15/596,884; Final Office Action; dated Jun. 28, 2018; 41 pages.
U.S. Appl. No. 15/113,973; Non-Final Office Action; dated May 22, 2018; 6 pages.
U.S. Appl. No. 15/114,990; Non-Final Office Action; dated Jun. 25, 2018; 11 pages.
U.S. Appl. No. 15/115,070; Notice of Allowance; dated Nov. 17, 2017; 10 pages.
U.S. Appl. No. 15/596,884; Non-Final Office Action; dated Oct. 5, 2017; 37 pages.
U.S. Appl. No. 15/961,739; Non-Final Office Action; dated Jul. 16, 2018; 5 pages.
U.S. Appl. No. 15/115,203; Non-Final Office Action; dated May 16, 2018; 24 pages.
European Patent Application No. 15743946.4; Office Action—Article 94(3); dated Mar. 13, 2020; 4 pages.
European Patent Application No. 15743946.4; Office Action—Article 94(3); dated Jul. 7, 2020; 3 pages.
English translation of OA for CN application 201810719971.X dated Mar. 25, 2021.
OA for CN application 201810719971.X dated Mar. 25, 2021.

* cited by examiner

POWER ADAPTER AND TERMINAL

CROSS-REFERENCE TO RELATED APPLICATIONS

This application is a U.S. national phase application based on International Application No. PCT/CN2015/070458, filed on Jan. 9, 2015, which is based on and claims priority to Chinese Patent Application No. 201410043148.3, filed on Jan. 28, 2014; Chinese Patent Application No. 201410042510.5, filed on Jan. 28, 2014; Chinese Patent Application No. 201410043062.0, filed on Jan. 28, 2014; Chinese Patent Application No. 201410042698.3, filed on Jan. 28, 2014, the entire contents of which are incorporated herein by reference.

TECHNICAL FIELD

The present disclosure generally relates to the charging technical field, and more particularly, to a power adapter and a terminal.

BACKGROUND

Currently, a smart phone is becoming increasingly popular for a consumer. However, because of large power consumption, the smart phone usually needs to be charged frequently. As the battery capacity of the smart phone is becoming larger, the charging time is becoming longer, such that how to realize a quick charging is pending to be solved.

An objective of the quick charging may be realized by increasing output current of a power adapter, however, when performing a quick charging on the battery in a manner of increasing the output current, a phenomena such as over-temperature, overvoltage, overcurrent and an interface burn-out usually occurs in the power adapter or the smart phone, such that a damage is caused on the power adapter or the smart phone.

In order to solve the problem, a communication mechanism may be introduced between the power adapter and the terminal, such that indexes or data may be interacted in time in a whole charging process, and a charging state may be monitored and controlled in real time. The Apple Inc. proposes a mechanism for maintaining a communication between a power adapter and an electronic device in a charging process in an application with a publication number CN 102769312A. However, in the above-described application, a time division multiplexing is applied on a power line during charging and data communication, such that a charging efficiency will be affected definitely. Further, in order to communicate during charging in a time division multiplexing manner, it is required to add an inductive element to isolate a data signal and a power channel, which leads to a great wastage and a severe heating phenomenon of an isolation element.

SUMMARY

Embodiments of the present disclosure provide a power adapter, a terminal and a charging system, so as to avoid the heating phenomenon occurs when applying a time division multiplexing on the power line.

In an embodiment, a power adapter is provided. The power adapter includes a power conversion component and a charging interface. The charging interface includes a power line. The power conversion component is configured to form a charging loop with a terminal via the power line for charging a battery of the terminal. The power adapter further includes a communication component, and the charging interface further includes a data line. During a coupling of the power adapter to the terminal, the communication component is configured to perform a bidirectional communication with the terminal via the data line.

In an embodiment, a terminal is provided. The terminal includes a battery and a charging interface, and the charging interface includes a power line. The terminal is configured to form a charging loop with a power adapter via the power line for charging the battery. The terminal further includes a communication component, and the charging interface further includes a data line. During a coupling of the terminal to the power adapter, the communication component is configured to perform a bidirectional communication with the power adapter via the data line.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

The technical solutions in embodiments of the present invention are hereinafter described clearly and completely with reference to accompanying drawings in embodiments of the present invention. Apparently, embodiments described are a part of embodiments of the present invention, but not all embodiments. All other embodiments obtained by those skilled in the art based on the embodiments in the present invention without creative labor shall fall in the protection scope of the present invention.

Figure 1:
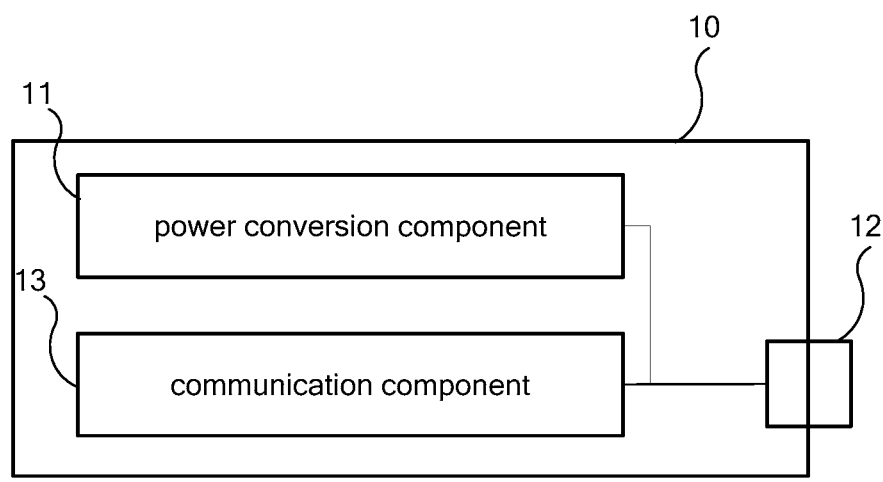
FIG. 1 is a schematic block diagram of a power adapter according to an embodiment of the present disclosure.

FIG. 1 is a schematic block diagram of a power adapter according to an embodiment of the present disclosure. The power adapter 10 shown in FIG. 1 includes a power conversion component 11 and a charging interface 12. The charging interface 12 includes a power line. The power conversion component 11 is configured to form a charging loop with a terminal via the power line for charging a battery of the terminal. The power adapter 10 further includes a communication component 13, and the charging interface 12 further includes a data line. During a coupling of the power adapter 10 to the terminal, the communication component 13 is configured to perform a bidirectional communication with the terminal via the data line.

In embodiments of the present disclosure, the power adapter still adopts a power line for charging the terminal. In addition, during the coupling of the power adapter to the terminal, the power adapter performs the bidirectional communication with the terminal via the data line. Compared with the method of applying a time division multiplexing on the power line with regard to data and power, the heating phenomenon of the power line due to an excessively high load of a signal isolation component can be avoided effectively.

In at least one embodiment, the bidirectional communication between the power adapter and the terminal may help to negotiate various parameters or negotiate various decisions with each other, such that a situation that a decision made by one party will affect the other party's normal operation may be avoided. For example, if the power adapter wishes to increase output current, a negotiation may be made with the terminal, and the output current is increased if the terminal agrees to increase the output current, such that a situation caused by increasing the output current by the power adapter unilaterally that the input current of the terminal is overcurrent may be avoided.

The above-described charging interface may be a USB (Universal Serial Bus) interface or a micro USB interface, the above-described power line is a power line in the USB interface, such as a power line of +5V and a power line of −5V; the above-described data line is a data line in the USB interface, such as a D+ line and a D− line.

In an embodiment, in a process of outputting by the power adapter 10 a charging current to the terminal, the communication component 13 is configured to perform a bidirectional communication with the terminal, so as to negotiate a charging mode. The charging mode includes a quick charging mode and a regular charging mode, and a charging current in the quick charging mode is greater than a charging current in the regular charging mode.

As an example, in the quick charging mode, an output current of the power adapter 10 may be set as 4-7 A, and in the regular charging mode, the output current of the power adapter 10 may be set as 1-3 A. After the power adapter 10 is coupled to the terminal, the power adapter 10 first charges the terminal in the regular charging mode, and the charging current is controlled to be 1-3 A. After the charging current is in the regular charging mode for 1-3 s, the power adapter 10 negotiates with the terminal, so as to switch the charging mode from the regular charging mode to the quick charging mode. The process of the negotiation may be various, for example, a request may be initiated by the terminal, and the power adapter 10 actively determines to enter into the quick charging mode; and the request may be initiated by the power adapter, and the terminal actively determines to enter into the quick charging mode. In addition, during the negotiation, information such as electric quantity, voltage, category or temperature of the battery in the terminal may be interacted, and information such as category of the terminal and category of the power adapter etc. may also be interacted, and whether to switch to the quick charging mode or not may be determined according to one or more of the information.

In an embodiment, after the power adapter 10 is coupled to the terminal, first the regular charging mode is adopted between the power adapter 10 and the terminal for charging, and during charging in the regular charging mode, the communication component 13 is configured to perform the bidirectional communication with the terminal so as to negotiate to switch to the quick charging mode.

Of course, the power adapter 10 may also first adopt the quick charging mode to charge the terminal, and negotiate with the terminal whether or not to switch to the regular charging mode, which shall not be elaborated herein.

In an embodiment, during charging in the regular charging mode, the communication component 13 is configured to perform the bidirectional communication with the terminal so as to negotiate to switch to the quick charging mode by performing following operations of: sending a quick charging inquiry message to the terminal, in which the quick charging inquiry message is used for instructing the terminal to determine whether a voltage of the battery reaches a quick charging voltage; if the voltage of the battery reaches the quick charging voltage, receiving a quick charging indication command sent by the terminal; and enabling the power adapter 10 to enter into the quick charging mode according to an indication of the quick charging indication command.

In an embodiment, during charging in the regular charging mode, the communication component 13 is configured to perform the bidirectional communication with the terminal so as to negotiate to switch to the quick charging mode by performing following operations of: receiving information indicating a voltage of the battery; enabling the power adapter 10 to determine whether the voltage of the battery reaches a quick charging voltage; and if the voltage of the battery reaches the quick charging battery, enabling the power adapter 10 to enter into the quick charging mode.

In an embodiment, the communication component 13 is configured to perform a communication with the terminal so as to determine a category of the battery. The category of the battery may include: a manufacturer of the battery, a rated power of the battery, and a material of the battery etc.

In an embodiment, the power adapter 10 is configured to determine a charging mode for the terminal according to the category of the battery, in which, the charging mode includes a quick charging mode and a regular charging mode, and a charging current in the quick charging mode is greater than a charging current in the regular charging mode.

For example, if the category of the battery can support the quick charging mode, the power adapter 10 determines to charge the terminal in the quick charging mode; if the category of the batty cannot support the quick charging mode, the power adapter 10 charges the terminal in the regular charging mode.

In an embodiment, the communication component 13 is configured to perform a communication with the terminal so as to determine an operation condition of the battery. The operation condition of the battery may include: voltage, electric quantity, and temperature etc. of the battery.

In an embodiment, the power adapter 10 is configured to determine a charging mode for the terminal according to the operation condition of the battery, in which, the charging mode includes a quick charging mode and a regular charging mode, and a charging current in the quick charging mode is greater than a charging current in the regular charging mode.

As an example, if the operation condition of the battery satisfies a preset quick charging condition, the power adapter 10 determines to charge the terminal in the quick charging mode; if the operation condition of the battery does not satisfy the preset quick charging condition, the power adapter 10 charges the terminal in the regular charging mode.

In an embodiment, the operation condition of the battery includes a voltage and/or a capacity of the battery, and the power adapter is further configured to determine a maximum output power of the power adapter corresponding to the voltage and/or the capacity of the battery, and to limit an output power to the maximum output power.

In an embodiment, the power adapter 10 may detect in real time or periodically whether the output power exceeds the maximum output power allowed by current voltage or electric quantity of the battery, and if the output power exceeds the maximum output power allowed by current voltage or electric quantity of the battery, a strategy of reducing the voltage or current may be adopted.

Figure 2:
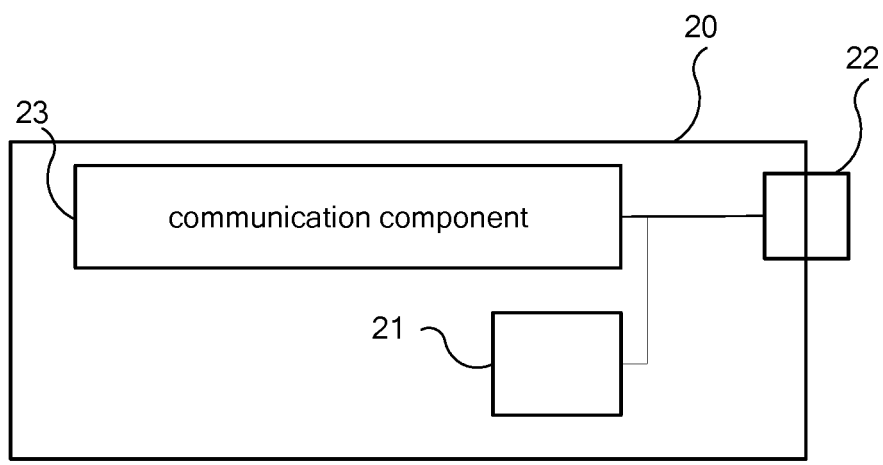
FIG. 2 is a schematic block diagram of a terminal according to an embodiment of the present disclosure.

FIG. 2 is a schematic block diagram of a terminal according to an embodiment of the present disclosure. The terminal 20 shown in FIG. 2 includes a battery 21 and a charging interface 22. The charging interface 22 includes a power line. The terminal 20 forms the charging loop with the power adapter via the power line for charging the battery 21. The terminal 20 further includes a communication component 23. The charging interface 22 further includes a data line. During a coupling of the terminal 20 to the power adapter, the communication component 23 is configured to perform a bidirectional communication with the power adapter via the data line.

In embodiments of the present disclosure, the power adapter still adopts a power line to charge the terminal. In addition, during the coupling of the power adapter to the terminal, the power adapter performs the bidirectional communication with the terminal through the data line. Compared with the method of applying a time division multiplexing on the power line with regard to data and power, the heating phenomenon of the power line due to an excessively high load of a signal isolation component can be avoided effectively.

In at least one embodiment, the bidirectional communication between the power adapter and the terminal may help to negotiate various parameters or negotiate various decisions with each other, such that a situation that a decision made by one party will affect the other party's normal operation may be avoided. For example, if the power adapter wishes to increase output current, a negotiation may be made with the terminal, and the output current is increased if the terminal agrees to increase the output current, such that a situation caused by increasing the output current by the power adapter unilaterally that the input current of the terminal is overcurrent may be avoided.

The above-described charging interface may be a USB (Universal Serial Bus) interface or a micro USB interface, the above-described power line is a power line in the USB interface, such as a power line of +5V and a power line of −5V; the above-described data line is a data line in the USB interface, such as a D+ line and a D− line.

In an embodiment, in a process of receiving by the terminal 20 a charging current from the power adapter, the communication component 23 is configured to perform a bidirectional communication with the power adapter, so as to negotiate a charging mode. The charging mode includes a quick charging mode and a regular charging mode, and a charging current in the quick charging mode is greater than a charging current in the regular charging mode.

In an embodiment, after the terminal 20 is coupled to the power adapter, first the regular charging mode is adopted between the terminal 20 and the power adapter for charging, and during charging in the regular charging mode, the communication component 23 is configured to perform a bidirectional communication with the power adapter so as to negotiate to switch to the quick charging mode As an example, in the quick charging mode, an output current of the power adapter 10 may be set as 4-7 A, and in the regular charging mode, the output current of the power adapter 10 may be set as 1-3 A. After the power adapter 10 is coupled with the terminal, the power adapter 10 first charges the terminal in the regular charging mode, and the charging current is controlled to be 1-3 A. After the charging current is in the regular charging mode for 1-3 s, the power adapter 10 negotiates with the terminal, so as to switch the charging mode from the regular charging mode to the quick charging mode. The process of the negotiation may be various, for example, a request may be initiated by the terminal, and the power adapter 10 actively determines to enter into the quick charging mode; and the request may be initiated by the power adapter, and the terminal actively determines to enter into the quick charging mode. In addition, during the negotiation, information such as electric quantity, voltage, category or temperature of the battery in the terminal may be interacted, and information such as category of the terminal and category of the power adapter etc. may also be interacted, and whether to switch to the quick charging mode or not may be determined according to one or more of the information.

In an embodiment, during charging in the regular charging mode, the communication component 23 is configured to perform the bidirectional communication with the power adapter so as to negotiate to switch to the quick charging mode by performing following operations of: receiving a quick charging inquiry message from the power adapter; after receiving the quick charging inquiry message, enabling the terminal 20 to determine whether a voltage of the battery 21 reaches a quick charging voltage; if the voltage of the battery 21 reaches the quick charging voltage, sending a quick charging indication command to the power adapter so as to enable the power adapter to enter into the quick charging mode.

In an embodiment, the communication component 23 is configured to perform a communication with the power adapter so as to inform the power adapter of a category or an operation condition of the battery 21.

Those skilled in the art can be aware that, units and algorithm steps in respective examples described with reference to embodiments disclosed in the present disclosure can be realized by electronic hardware or combination of computer software and electronic hardware. Executing these functions in hardware or software depends on particular applications and design constraint conditions of the technical solutions. Technology professionals can use different methods to realize the described functions for each particular application, which should be regarded as being within the scope of the present disclosure.

Those skilled in the art can understand clearly that, for convenience and simplicity of description, specific working process of the above system, devices and units may refer to corresponding process in the above method embodiments, which will not be elaborated herein.

It should be understood that, the system, devices and method disclosed in several embodiments provided by the present disclosure can be realized in any other manner. For example, the device embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit.

If the functions are realized in form of functional software units and are sold or used as separate products, they can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:

1. A power adapter, comprising a power conversion component and a charging interface, the charging interface comprising a power line; the power conversion component being configured to form a charging loop with a terminal via the power line, for charging a battery of the terminal; and wherein, the power adapter further comprises a communication component, the charging interface further comprises a data line; during a coupling of the power adapter to the terminal, in a process of outputting by the power adapter a charging current to the terminal for charging the battery, the communication component is configured to perform a bidirectional communication with the terminal via the data line, so as to negotiate a charging mode, wherein, the charging mode comprises a quick charging mode and a regular charging mode, and a charging current outputted by the power adapter for charging the battery in the quick charging mode is greater than a charging current outputted by the power adapter for charging the battery in the regular charging mode;

wherein, after the power adapter is coupled to the terminal, first the regular charging mode is adopted between the power adapter and the terminal for charging; and during charging in the regular charging mode, the communication component is configured to perform the bidirectional communication with the terminal so as to negotiate to enter into the quick charging mode;

wherein, during charging in the regular charging mode, the communication component is configured to perform the bidirectional communication with the terminal so as to negotiate to enter into the quick charging mode by performing following operations of:

sending a quick charging inquiry message to the terminal, wherein the quick charging inquiry message is used for instructing the terminal to determine whether a voltage of the battery reaches a quick charging voltage;

receiving a quick charging indication command sent by the terminal, if the voltage of the battery reaches the quick charging voltage; and enabling the power adapter to enter into the quick charging mode according to an indication of the quick charging indication command.

2. The power adapter according to claim 1, wherein, during charging in the regular charging mode, the communication component is configured to perform the bidirectional communication with the terminal so as to negotiate to enter into the quick charging mode by performing following operations of:

receiving information indicating a voltage of the battery;

enabling the power adapter to determine whether the voltage of the battery reaches a quick charging voltage; and enabling the power adapter to enter into the quick charging mode, if the voltage of the battery reaches the quick charging voltage.

3. The power adapter according to claim 1, wherein, the charging interface is a USB interface, the power line is a power line in the USB interface and the data line is a data line in the USB interface.

4. The power adapter according to claim 1, wherein, the negotiating a charging mode comprises, by the power adapter, increasing the charging current when the terminal agrees to increase the charging current; and the communication component is configured to perform a communication with the terminal so as to determine a category of the battery; the power adapter is configured to determine the charging mode as the regular charging mode when the category of the batty does not support the quick charging mode and to determine the charging mode as the quick charging mode when the category of the batty supports the quick charging mode.

5. The power adapter according to claim 4, wherein, the category of the battery comprises at least one of: a manufacturer of the battery, a rated power of the battery, and a material of the battery.

6. The power adapter according to claim 1, wherein, the charging current outputted by the power adapter for charging the battery in the quick charging mode is set as 4-7 A, and the charging current outputted by the power adapter for charging the battery in the regular charging mode is set as 1-3 A.

7. The power adapter according to claim 1, wherein, the communication component is configured to perform a communication with the terminal so as to determine an operation condition of the battery; the operation condition of the battery comprises at least one of a voltage and an electric quantity, and the power adapter is further configured to determine a maximum output power of the power adapter corresponding to the at least one of the voltage and the electric quantity, and to limit an output power to the maximum output power by detecting whether the output power exceeds the maximum output power and reducing the voltage or current when the output power exceeds the maximum output power.

8. The power adapter according to claim 7, wherein, the power adapter is configured to determine a charging mode for the terminal according to the operation condition of the battery, wherein, the charging mode comprises a quick charging mode and a regular charging mode, and a charging current in the quick charging mode is greater than a charging current in the regular charging mode.

9. The power adapter according to claim 7, wherein, the operation condition of the battery comprises at least one of: a voltage, an electric quantity, and a temperature of the battery.

10. The power adapter according to claim 7, wherein, the power adapter is further configured to limit the output power to the maximum output power by detecting whether the output power exceeds the maximum output power and adopting a voltage or current reducing strategy if the output power exceeds the maximum output power.

11. A terminal, comprising a battery and a charging interface, the charging interface comprising a power line; the terminal being configured to form a charging loop with a power adapter via the power line, for charging the battery, and wherein, the terminal further comprises a communication component, the charging interface further comprises a data line, during a coupling of the terminal to the power adapter, in a process of receiving by the terminal a charging current from the power adapter for charging the battery, the communication component is configured to perform a bidirectional communication with the power adapter via the data line, so as to negotiate a charging mode, wherein, the charging mode comprises a quick charging mode and a regular charging mode, and a charging current from the power adapter for charging the battery in the quick charging mode is greater than a charging current from the power adapter for charging the battery in the regular charging mode;

wherein, after the terminal is coupled to the power adapter, first the regular charging mode is adopted between the terminal and the power adapter for charging; and during charging in the regular charging mode, the communication component is configured to perform the bidirectional communication with the power adapter so as to negotiate to enter into the quick charging mode;

wherein, during charging in the regular charging mode, the communication component is configured to perform the bidirectional communication with the power adapter so as to negotiate to enter into the quick charging mode by performing following operations of:

receiving a quick charging inquiry message from the power adapter;

enabling the terminal to determine whether a voltage of the battery reaches a quick charging voltage, after receiving the quick charging inquiry message; and sending a quick charging indication command to the power adapter if the voltage of the battery reaches the quick charging voltage, so as to enable the power adapter to enter into the quick charging mode.

12. The terminal according to claim 11, wherein, the charging interface is a USB interface, the power line is a power line in the USB interface and the data line is a data line in the USB interface.

13. The terminal according to claim 11, wherein, the negotiating a charging mode comprises, by the power adapter, increasing the charging current when the terminal agrees to increase the charging current; and the communication component is configured to perform a communication with the power adapter so as to inform the power adapter of a category of the battery, such that the power adapter determines the charging mode as the regular charging mode when the category of the batty does not support the quick charging mode and determines the charging mode as the quick charging mode when the category of the batty supports the quick charging mode.

14. The terminal according to claim 11, wherein, the charging current outputted by the power adapter for charging the battery in the quick charging mode is set as 4-7 A, and the charging current outputted by the power adapter for charging the battery in the regular charging mode is set as 1-3 A.

15. The terminal according to claim 11, wherein, the communication component is configured to perform a communication with the power adapter so as to inform the power adapter of an operation condition of the battery, the operation condition of the battery comprises at least one of a voltage and an electric quantity, such that the power adapter determines a maximum output power of the power adapter corresponding to the at least one of the voltage and the electric quantity, and limits an output power to the maximum output power by detecting whether the output power exceeds the maximum output power and reducing the voltage or current when the output power exceeds the maximum output power.

* * * * *